(12) United States Patent
Turunen

(10) Patent No.: US 11,317,150 B2
(45) Date of Patent: Apr. 26, 2022

(54) VIDEO BLURRING SYSTEMS AND METHODS

(71) Applicant: Netflix, Inc., Los Gatos, CA (US)

(72) Inventor: Juha Turunen, Sunnyale, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 16/904,554

(22) Filed: Jun. 17, 2020

(65) Prior Publication Data
US 2021/0400345 A1 Dec. 23, 2021

(51) Int. Cl.
H04N 21/454 (2011.01)
H04N 21/442 (2011.01)
H04N 21/44 (2011.01)

(52) U.S. Cl.
CPC ... H04N 21/4542 (2013.01); H04N 21/44008 (2013.01); H04N 21/44213 (2013.01)

(58) Field of Classification Search
None
See application file for complete search history.

(56) References Cited

U.S. PATENT DOCUMENTS

| | | | |
|---|---|---|---|
| 5,914,748 A * | 6/1999 | Parulski | H04N 5/272 348/239 |
| 6,956,576 B1 | 10/2005 | Deering et al. | |
| 6,993,148 B1 * | 1/2006 | Miyashita | G06T 1/0028 382/100 |
| 8,249,365 B1 * | 8/2012 | Winnemoeller | G06F 3/0484 382/219 |
| 9,311,688 B1 * | 4/2016 | Rosenberg | G06T 1/20 |
| 9,992,553 B2 * | 6/2018 | Bennett | H04N 21/25833 |
| 10,070,154 B2 * | 9/2018 | Holzer | H04N 21/2187 |
| 10,841,491 B2 * | 11/2020 | Mathy | H04N 5/232411 |
| 2005/0286791 A1 * | 12/2005 | Katohgi | H04N 1/409 382/252 |
| 2011/0200259 A1 * | 8/2011 | Lindskog | G06T 5/005 382/201 |
| 2011/0292216 A1 * | 12/2011 | Fergus | H04N 5/2355 348/164 |

(Continued)

OTHER PUBLICATIONS

International Search Report and Written Opinion received for PCT Application Serial No. PCT/US2021/037526 dated Oct. 20, 2021, 11 pages.

*Primary Examiner* — An Son P Huynh
(74) *Attorney, Agent, or Firm* — FisherBroyles, LLP

(57) ABSTRACT

The disclosed computer-implemented method includes determining that an image is to be blurred. The image has multiple pixels arranged along horizontal and/or vertical axes. The method next includes identifying a boundary size for a sliding window within which pixel values are to be sampled from the image and sampling, from pixels that lie on an axis that is diagonal relative to the horizontal/vertical axis of the image, various pixel values from within the boundary of the sliding window. The pixels sampled along the diagonal angle within the sliding window are selected according to a specified noise pattern. The method further includes performing an initial convolution pass on the pixels surrounding the sampled pixels to blur at least some of the pixels surrounding the sampled pixels, and then presenting the blurred image. Various other methods, systems, and computer-readable media are also disclosed.

20 Claims, 9 Drawing Sheets

(56) References Cited

U.S. PATENT DOCUMENTS

| | | | |
|---|---|---|---|
| 2012/0090000 A1* | 4/2012 | Cohen | G11B 27/034 |
| | | | 725/32 |
| 2013/0022288 A1* | 1/2013 | Sartor | G06T 5/002 |
| | | | 382/266 |
| 2014/0161359 A1* | 6/2014 | Magri | G06T 7/13 |
| | | | 382/199 |
| 2015/0030246 A1 | 1/2015 | Wilensky et al. | |
| 2015/0146994 A1 | 5/2015 | Arnison et al. | |
| 2016/0057497 A1* | 2/2016 | Kim | H04N 21/4182 |
| | | | 725/10 |
| 2019/0147185 A1* | 5/2019 | Cai | G06F 21/6245 |
| | | | 726/30 |
| 2019/0238719 A1* | 8/2019 | Alameh | H04N 1/00209 |
| 2021/0102235 A1* | 4/2021 | Goto | G06T 7/0014 |

\* cited by examiner

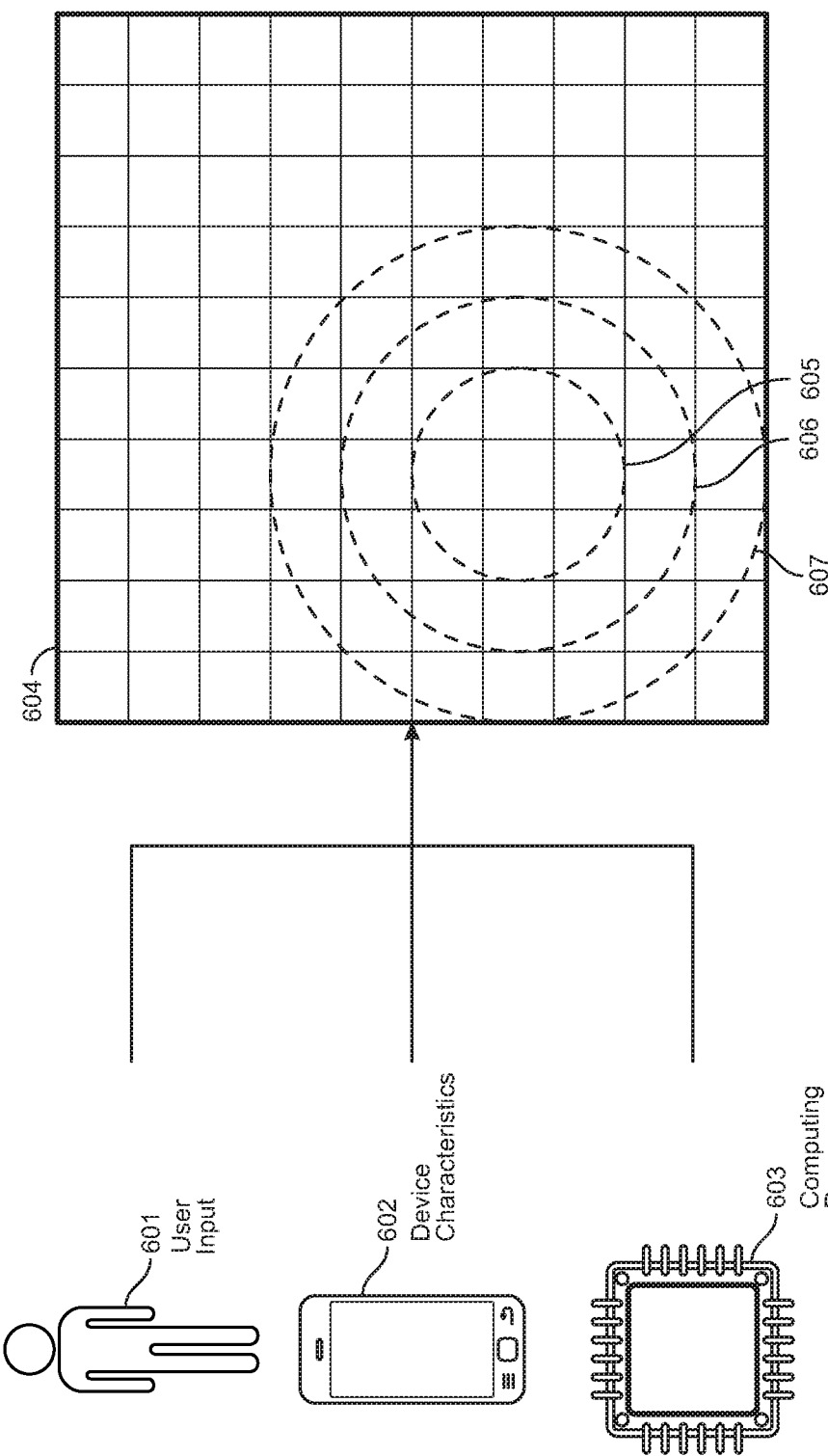

VIDEO BLURRING SYSTEMS AND METHODS

BACKGROUND

Many times, images or parts of images are blurred in a movie or television show. These blurred portions may be aimed at obscuring a trademarked product, or blurring content that may be objectionable to some users. In a traditional blurring process, a computing device will sample certain pixels along a horizontal or vertical axis and blur the sampled pixels or pixels that are near to the sampled pixels. This blurring process is typically performed in two passes: one pass for the horizontal blur and one pass for the vertical blur. When using these traditional blurring algorithms, if a 100×100 pixel area is to be blurred, the computing device will need to take 100×100 samples per pixel. This sampling process, even if broken up into two different passes of 2×100, is still highly resource intensive. Moreover, traditional attempts to reduce the amount of processing in these blurring algorithms typically lead to artifacts that are noticeable and distracting to users.

SUMMARY

As will be described in greater detail below, the present disclosure describes systems and methods for selectively blurring pixels in an image. One of these methods includes determining that at least a portion of a digital image is to be blurred. The image includes multiple pixels arranged in a grid along a horizontal axis or a vertical axis. The method further includes identifying a boundary size for a sliding window within which pixel values will be sampled from the image. The method also includes sampling, from pixels that lie on an axis that is diagonal relative to the horizontal axis of the image and/or the vertical axis of the image, various pixel values from within the boundary of the sliding window. The pixels sampled along the diagonal angle within the sliding window are selected according to a specified noise pattern. The method also includes performing an initial convolution pass on pixels surrounding the sampled pixels to blur at least some of the pixels surrounding the sampled pixels. The method then includes presenting the digital image. At least some of the image is blurred as a result of the initial convolution pass.

In some examples, the method further includes performing a subsequent convolution pass on different image pixels surrounding the sampled pixels. In some examples, the initial convolution pass is performed at a specified diagonal angle, and the subsequent convolution pass is performed at an opposite diagonal angle that is opposite to the specified diagonal angle. In some examples, multiple-pass convolutions are performed to reduce the number of samples taken within the sliding window.

In some examples, the image is one of a plurality of sequential images in a video media item. In some examples, at least a portion of the sequential images is sequentially blurred according to the sampling. In some examples, the pixels within the sliding window are selected for sampling on a per-pixel basis.

In some examples, subsequent to presenting the blurred image, the method includes transitioning back to the original, unblurred image. In some examples, a specified number of pixels are sampled from within the sliding window. In some examples, the specified number of pixels that are to be sampled within the sliding window is selected by a user. In some examples, the specified number of pixels that are to be sampled within the sliding window is selected based on electronic device specifications and/or available processing resources on the electronic device. In some examples, the specified number of pixels that are to be sampled within the sliding window is dynamically adapted based on currently available processing resources.

In addition, a corresponding system may include at least one physical processor and physical memory comprising computer-executable instructions that, when executed by the physical processor, cause the physical processor to determine that at least a portion of an image is to be blurred, where the image includes multiple pixels arranged along at least one of a horizontal axis or a vertical axis, identify a boundary size for a sliding window within which pixel values are to be sampled from the image, and sample, from pixels that lie on an axis that is diagonal relative to at least one of the horizontal axis of the image or the vertical axis of the image, various pixel values from within the boundary of the sliding window. The pixels sampled along the diagonal angle within the sliding window are selected according to a specified noise pattern. The physical processor is further configured to perform an initial convolution pass on pixels surrounding the sampled pixels to blur at least some of the pixels surrounding the sampled pixels and then present the image, at some of which is blurred as a result of the initial convolution pass.

In some examples, the sliding window includes a circle with a specified radius within which the pixels are sampled, and where the size of the radius is dynamically controlled per-pixel. In some examples, the physical processor is further configured to identify various portions of content within the image, determine that the identified content has one or more prominent angles, and alter the sampling of pixels that lie on an axis that is diagonal relative to the horizontal axis of the image or relative to the vertical axis of the image. As such, the altered sampling avoids the prominent angles.

In some examples, the physical processor is further configured to rotate the sliding window by a dynamically determined amount at each sampled pixel. In some examples, the specified noise pattern is a blue noise filter. In some examples, noise values selected from the blue noise pattern are accessed from a lookup table. In some cases, the accessed noise values are implemented for multiple convolutions before new noise values are accessed. As such, a new noise value may be selected per pixel per pass, resulting in two times the number of pixels in the image or frame that is being processed. In some examples, the sliding window is at least partially altered prior to performing each convolution.

In some examples, the above-described method is encoded as computer-readable instructions on a computer-readable medium. In one example, a computer-readable medium includes computer-executable instructions that, when executed by at least one processor of a computing device, cause the computing device to determine that at least a portion of an image is to be blurred, where the image includes multiple pixels arranged along at least one of a horizontal axis or a vertical axis, identify a boundary size for a sliding window within which pixel values are to be sampled from the image, and sample, from pixels that lie on an axis that is diagonal relative to at least one of the horizontal axis of the image or the vertical axis of the image, various pixel values from within the boundary of the sliding window. The pixels sampled along the diagonal angle within the sliding window are selected according to a specified noise pattern. The computing device is further configured to perform an initial convolution pass on pixels surrounding the sampled pixels to blur at least some of the pixels surrounding the sampled pixels and then present the image, at some of which is blurred as a result of the initial convolution pass.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 6 illustrates an embodiment in which a sliding window boundary size is dynamically changed according to different elements.

Figure 1:
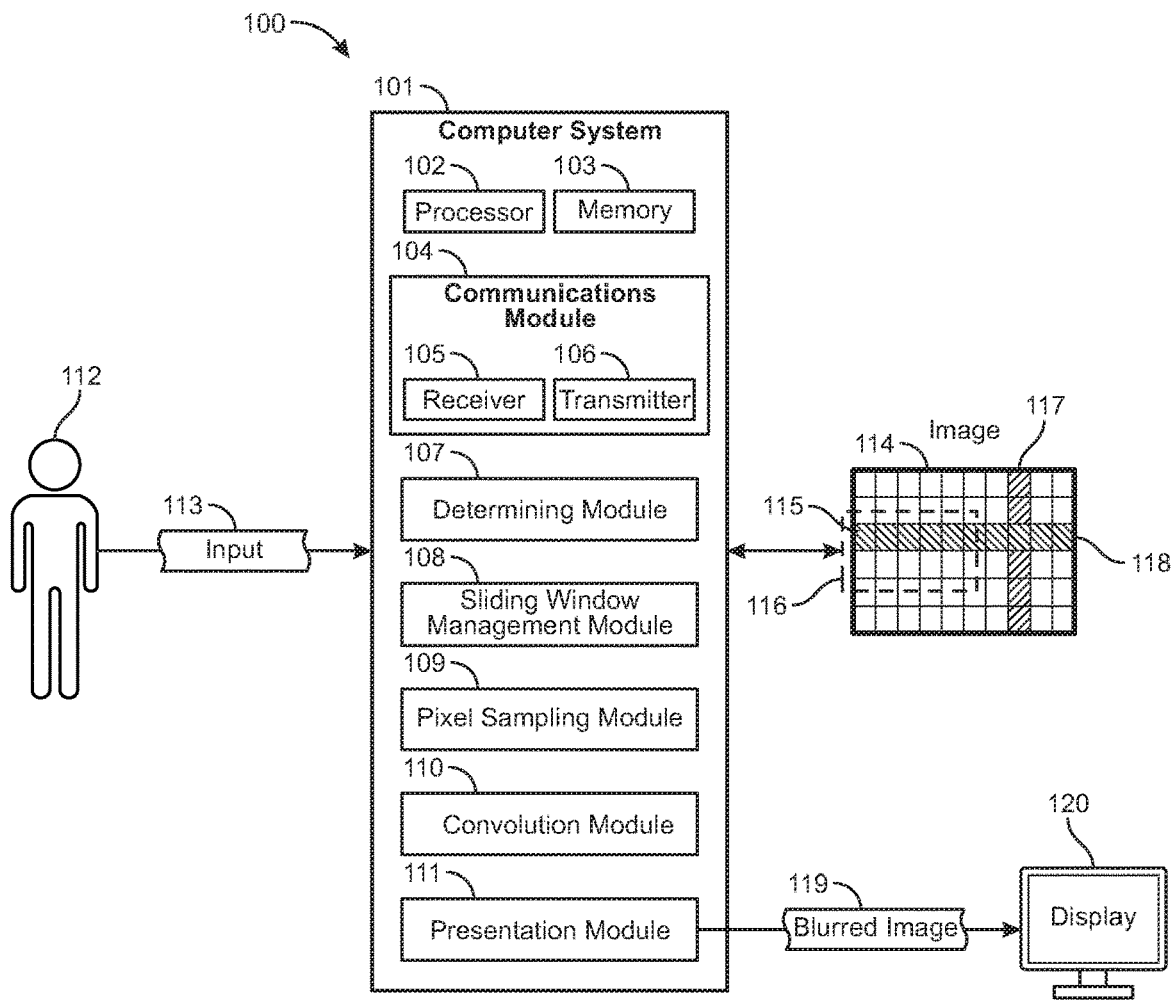
FIG. 1 illustrates a computing architecture in which pixels are selectively blurred within an image.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to selectively blurring pixels in a digital image or a sequence of digital images. As noted above, image blurring is typically performed by taking samples of pixel data for pixels along horizontal or vertical axes within the grid that forms the digital image. This pixel data is then used to generate a blur that obfuscates the underlying content in the image. The blur is typically generated by convolving pixel values to values that are different enough from the original colors to cause blurring, but not so different that the underlying image appears to have colors that were not originally part of the image. In a typical example, a computing device will need to sample a block of 100×100 pixels per pixel to generate a 100×100 blur. In some cases, the horizontal pixels within the 100×100 grid are initially sampled on a first pass, and the vertical pixels in the 100×100 grid are then sampled in a second pass. Sampling this high number of pixels, however, is impractical on limited-resource devices and consumes computing resources unnecessarily on high-resource devices. Moreover, traditional solutions that attempt to reduce the amount of processing often lead to noticeable artifacts in the digital image.

Moreover, many digital images (or other computer-generated graphics including graphical user interfaces (GUIs)) include text or other objects that are aligned horizontally or vertically. For example, the letter "T" is perfectly aligned along horizontal and vertical axes. Applying an image blur using a traditional blurring technique that samples pixels along horizontal and vertical axes would result in ghosting or other artifacts in the blurred portions of the image. These artifacts may stand out to users and may distract those users from enjoying the image, movie, GUI, or other form of digital content.

In contrast thereto, the embodiments described herein are designed to reduce the number of samples needed to generate a high-quality blur effect in an image. In some cases, the number of samples taken depends on the processing characteristics of the device, or on which computing resources are currently available. Still further, the embodiments described herein are designed to remove the likelihood of having artifacts in the blur effect by using specific noise patterns to choose the samples. In some cases, for example, blue noise values are used to determine which pixels to sample in the image grid. In contrast to traditional techniques that sample pixels along horizontal and vertical axes, the embodiments described herein sample pixels along a diagonal relative to the horizontal and vertical axes. Moreover, the sampled pixels along the diagonal are selected using blue noise values or some other noise pattern to reduce the creation of artifacts when generating the blur effect. These embodiments will be described in greater detail below with regard to computing architecture 100 of FIG. 1, method 200 of FIG. 2, and the embodiments depicted in FIGS. 3-11.

FIG. 1 illustrates a computing environment 100 that includes a computer system 101. The computer system 101 includes software modules, embedded hardware components such as processors, or a combination of hardware and software. The computer system 101 is substantially any type of computing system including a local computing system or a distributed (e.g., cloud) computing system. In some cases, the computer system 101 includes at least one processor 102 and at least some system memory 103. The computer system 101 includes program modules for performing a variety of different functions. The program modules are hardware-based, software-based, or include a combination of hardware and software. Each program module uses computing hardware and/or software to perform specified functions, including those described herein below.

The computer system 101 also includes a communications module 104 that is configured to communicate with other computer systems. The communications module 104 includes any wired or wireless communication means that can receive and/or transmit data to or from other computer systems. These communication means include hardware interfaces including Ethernet adapters, WIFI adapters, hardware radios including, for example, a hardware-based receiver 105, a hardware-based transmitter 106, or a combined hardware-based transceiver capable of both receiving and transmitting data. The radios are cellular radios, Bluetooth radios, global positioning system (GPS) radios, or other types of radios. The communications module 104 is configured to interact with databases, mobile computing devices (such as mobile phones or tablets), embedded or other types of computing systems.

The computer system 101 further includes a determining module 107. The determining module is configured to access an image 114 (or series of images in a movie or television show, or an instance of a GUI, etc.) and determine that a blur effect is to be applied to the image. The sliding window management module 108 defines and manages a sliding window 116 within which pixel data samples are taken by the pixel sampling module 109. The sliding window 116 is configured to operate in substantially any shape or size, and may cover a single pixel or the entire image or anything in between. For example, image 114 includes a plurality of pixels laid out in a grid. The grid includes multiple columns and rows, where the columns are arranged along a vertical axis 117, and the rows are arranged along a horizontal axis 118. The sliding window 116 specifies an area within which pixels will be sampled to create the blur effect, thereby limiting the number of pixels that are sampleable. This sliding window 116 may change in size dynamically and may change continually over time. In some cases, the sliding window changes with each sampled pixel.

The pixel sampling module 109 thus samples pixels within the sliding window 116. The pixel sampling module 109 then samples pixel 115, for example, and provides that pixel data to the convolution module 110. The convolution module 110 convolves (e.g., performs a convolution algorithm on) the sampled pixels, the pixels surrounding the sampled pixels, or both, depending on the configuration. The convolution module 110 performs the convolution in either a single pass or in multiple passes. In some cases, a single-pass convolution convolves the sampled pixels or the pixels around the sampled pixels (collectively referred to herein as a "sampled pixel area") after taking one set of samples along a diagonal relative to the vertical and horizontal axes 117/118. In other cases, the convolution module performs a multi-pass convolution in which sampled pixel areas along other diagonals are further convolved in subsequent passes. Such multi-pass configurations reduce the number of pixels that need to be sampled, thereby also reducing the computing resources needed to generate the blur effect. Once the image has been blurred according to the convolution(s), the presentation module 111 presents the blurred image 119 on a display 120. These embodiments will now be described further with regard to method 200 of FIG. 2.

Figure 2:
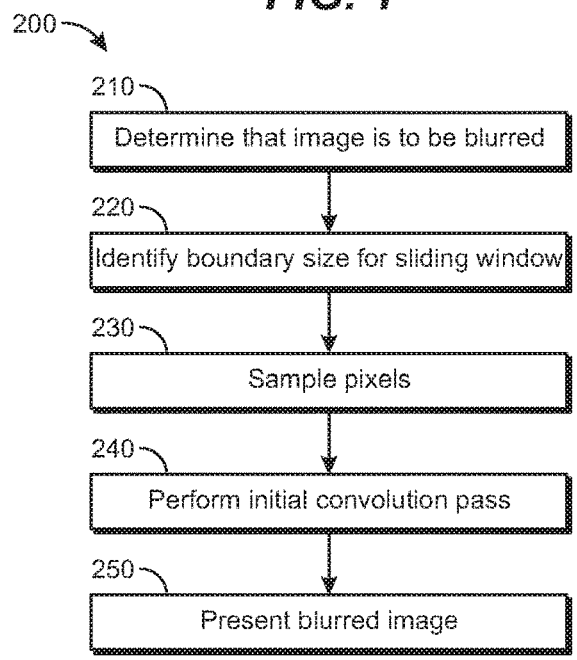
FIG. 2 is a flow diagram of an exemplary method for selectively blurring pixels in an image.

FIG. 2 is a flow diagram of an exemplary computer-implemented method 200 for selectively blurring pixels in an image. The steps shown in FIG. 2 are performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, method 200 includes determining that at least a portion of an image is to be blurred. The image includes multiple pixels arranged along horizontal and vertical axes. For instance, in one example, determining module 107 of FIG. 1 determines that image 114 is to be blurred. In some cases, the blurring applies to some of the image 114, and in other cases, the blurring applies to all of the image 114. Moreover, the blurring may apply to a single image or to a sequence of images (e.g., in a movie). (Herein, it is assumed that any mention of applying blurring to a single image could also be applied to multiple sequential images, as in a movie or video). The blurring is applied in substantially any shape or pattern including a round pattern, an oval pattern, a square pattern, a rectangular pattern, an amorphous or hand-drawn pattern, or some other type of pattern (e.g., based on an image). In some cases, an outside user (e.g., 112) provides input 113 indicating where the blurring is to be applied and to which images and in which patterns.

In some cases, the amount of blurring applied to the image is dependent on the computer system or other electronic device applying the blurring. A higher quality, more visually convincing blur effect is typically the result of additional computer processing, requiring additional central processing unit (CPU) time, memory usage, graphics processing unit (GPU) time, data storage, network bandwidth, data accessing time (e.g., time spent accessing stored data values such as lookup table values in random access memory (RAM) or in some other type of memory), or other processing resources. A lesser quality, but still adequate blurring effect can be applied to the image on a lower-resource computing system, or on a device that has fewer processing resources currently available. In general, more samples are taken in a higher-quality blur, and fewer samples are taken in a lower-quality blur.

Method 200, at step 220, next includes identifying a boundary size for a sliding window within which pixel values are to be sampled from the digital image. Thus, when a blur effect is to be generated for image 114, the sliding window management module 108 identifies a boundary size (or shape or other characteristics) for sliding window 116. Then, samples are taken from the image 114 within the boundaries of the sliding window 116. The image 114 is a digital image and, as such, includes many thousands or millions of pixels. Each pixel includes a color value. The combined grid of pixel color values represents an underlying image or the "content" of the image. It is this content (or at least a portion thereof) that to be blurred by the blurring effect.

In order to generate the blurring effect, pixel values are sampled from within the sliding window 116. As noted above, the sliding window 116 may be any shape or size, and may change shape or size after the sampling of each pixel. Indeed, the embodiments described herein allow pixel-by-pixel control over each pixel value that is sampled and subsequently used in determining an appropriate convolution. In step 230 of Method 200, the pixel sampling module 109 samples from pixels that lie within the sliding window 116. More specifically, the sampled pixels (e.g., 115) lie on an axis that is diagonal relative to the horizontal axis 118 of the image and/or the vertical axis 117 of the image. It will be understood that the phrases "sampling pixels" and "sampling pixel values" are used interchangeably herein, and both phrases are intended to mean that pixel values are identified and stored for those pixels that are sampled by the pixel sampling module 109.

Figure 3:
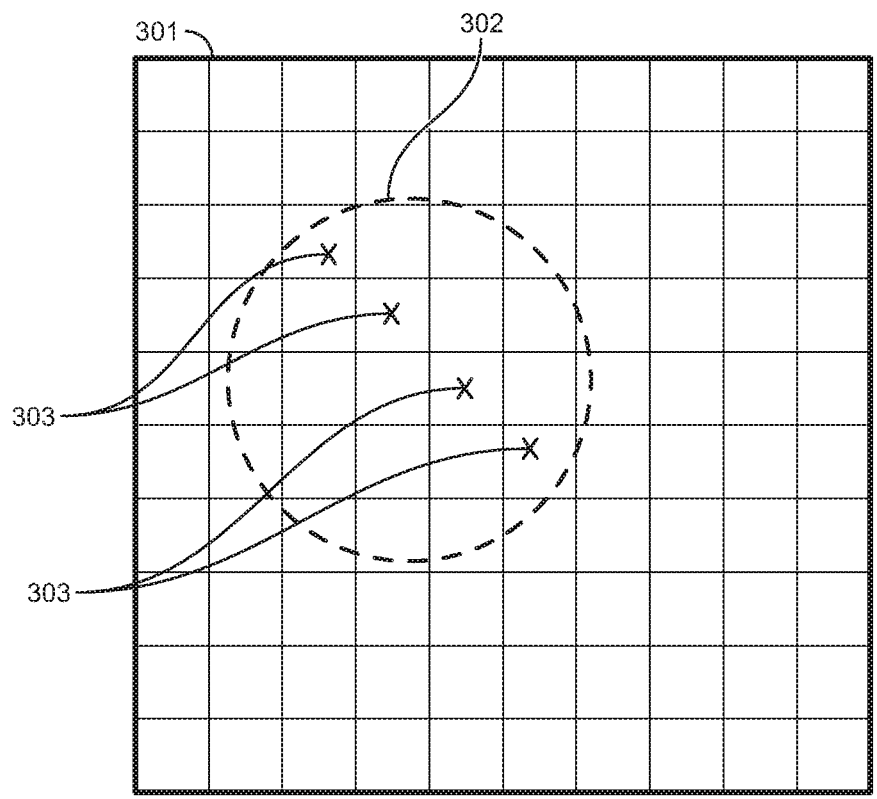
FIG. 3 illustrates an embodiment in which pixels are sampled along a diagonal with respect to horizontal or vertical axes.

As noted above, merely sampling pixels along the vertical or horizontal axis of the image will result in ghosting or other artifacts when the blurring effect is applied. These artifacts are undesirable and distract from the viewer's overall experience. The embodiments described herein sample pixels on a diagonal relative to the horizontal or vertical axes. Sampling the pixels in this manner reduces or eliminates the ghosting and other artifacts seen in traditional systems. FIG. 3 illustrates an embodiment in which pixels are sampled at a diagonal relative to the horizontal or vertical axes. FIG. 3 illustrates a digital image 301 that includes four sampled pixels 303. These sampled pixels are all within the sliding window 302, and are all on a diagonal relative to the horizontal and vertical axes of the pixel grid. This drawing, it should be noted, is a simplification of a real-life sampling, but it remains illustrative. In a real-world image, the image would likely include millions of pixels. The sampled pixels do not need to be on a directly straight diagonal line as shown in FIG. 3. Rather, the sampled pixels are sampled in clusters, where the cluster forms a generally diagonal line relative to the horizontal or vertical axes. In some cases, the pixels sampled along the diagonal angle within the sliding window are selected according to a noise pattern. The noise pattern ensures that the pixels that are sampled are chosen in a pseudo-random manner. In certain cases, some types of noise patterns are better than others at selecting sample pixels that will lead to an optimal blur effect. This concept will be explored further below.

Method 200 of FIG. 2 next includes, at step 240, performing an initial convolution pass on pixels surrounding the sampled pixels to blur at least some of the pixels surrounding the sampled pixels. The convolution module 110 of computer system 101 in FIG. 1 performs a convolution on the area that is to be blurred. This convolution occurs in a single pass, or occurs in multiple passes. Each pass convolves some or all of the pixels in the specified area. The convolution incorporates the pixel values of the sampled pixels and convolves those pixel values with a kernel or other set of values (e.g., a filter) that will create the blurring effect. In some cases, the blurring effect extends beyond the sliding window 116 in which the pixels are sampled, and in other cases, the blurring effect stays within the bounds of the sliding window. Once the convolution pass or passes have been performed, the blurred image 119 is prepared for presentation on a display 120 (step 250 of Method 200). The viewer (e.g., 112) then sees the blurred image 119 that includes the blur effect generated by the convolution.

Figure 4:
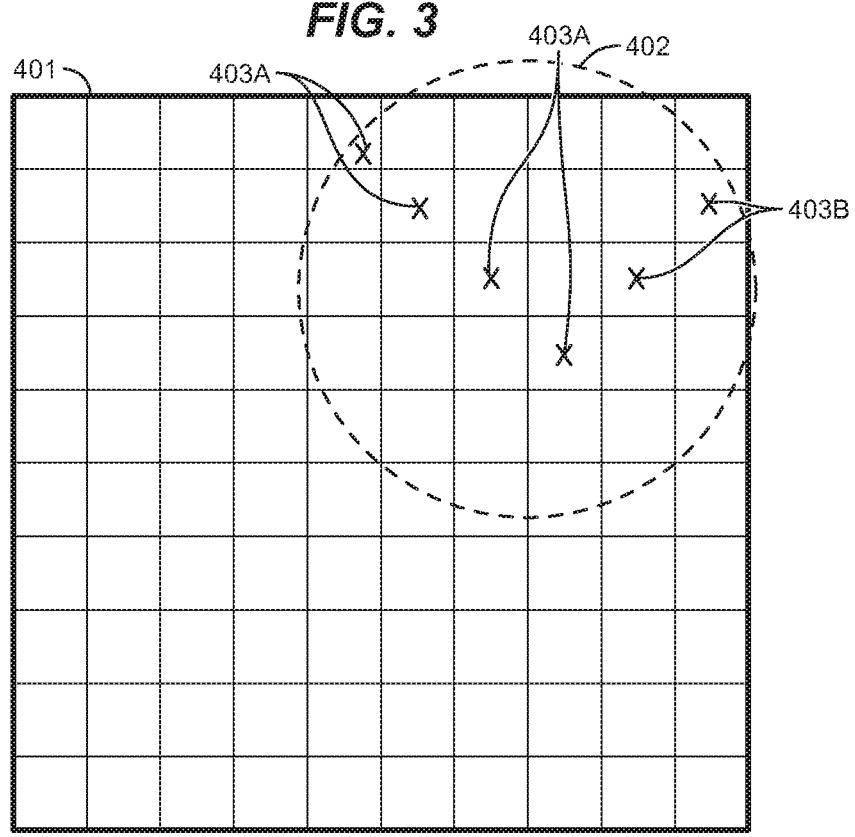
FIG. 4 illustrates an embodiment in which pixels are sampled along multiple diagonals in multiple passes with respect to horizontal or vertical axes.

In some cases, the convolution is performed in two passes. In other cases, the convolution is performed in two or more passes. In one of these cases, the initial pass samples and convolves one portion of the image, while a subsequent pass samples and convolves a different portion of the image. The two different portions of the image either have some overlap or are entirely separate. In one case, for example, the initial convolution pass is performed at a specified diagonal angle, and the subsequent convolution pass is performed at an opposite diagonal angle that is opposite to the first diagonal angle. For instance, as shown in FIG. 4, image 401 includes sampled pixels 403A and 403B that are within the sliding window 402. The sampled pixels 403A were convolved during the initial pass, and the sampled pixels 403B were convolved during the subsequent pass. The sampled pixels 403B were sampled at an angle that is 90 degrees different (e.g., rotated) relative to the sampled pixels 403A. It will be understood here that the pixels are sampled and convolved in substantially any angle, with respect to the image grid or with respect to each other. In some cases, the sliding window is rotated to sample pixels at other diagonal angles (e.g., 30 degrees, 45 degrees, 60 degrees, or some other diagonal angle that is different than the initial pass, etc.). This rotation of the sliding window and the sampling further reduces the likelihood of creating artifacts in the blurred image.

In some case, convolutions are performed in multiple passes to reduce the number of samples taken within the sliding window. Each pixel value sample takes CPU time and computing resources. The embodiments described herein attempt to use fewer samples than conventional approaches and still provide a visually appealing blur effect. Taking fewer samples results in less CPU usage and longer battery life in mobile devices. By performing a convolution in multiple passes (e.g., in two, three, or more passes), each pass can involve fewer samples and thereby use fewer computing resources while still maintaining a minimum level of blur effect quality. This allows the embodiments described herein to run capably on low-specification devices that have relatively slow processors, relatively small amounts of memory, etc.

In some cases, the blur effect generated for one image is applied to multiple subsequent images. For example, in a movie, video clip, or other video media item, a blur effect is applied to multiple sequential images in that video item. If the movie includes 24 frames every second, for instance, the blur is applied to hundreds of frames over a period of ten seconds. In other cases, the blur effect may change (either slightly or greatly) in each image of the sequence or at specific places within the sequence (e.g., at a scene change). In still other cases, the blur effect applies until a specified marker is reached or until the blurred object is no longer in scene. In some cases, machine learning is used to identify the content of the image and detect when an item that is to be blurred is in the scene (i.e., in the image). In such cases, the blur effect is generated in a manner that tracks the item when it is on screen and blurs that item whenever it appears on screen. In other cases, a portion of an object is blurred while the remainder of the object remains sharp. For instance, a car's logo or license plate may be blurred while the rest of the car remains in focus. The car's logo or license plate is thus tracked using object recognition and blurred wherever it appears within the video item.

Figure 5:
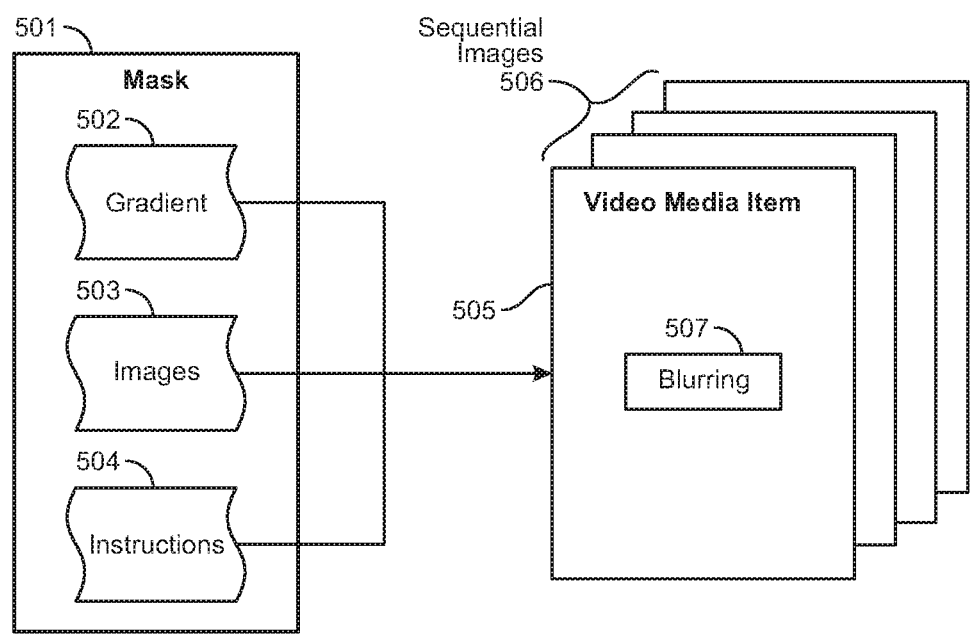
FIG. 5 illustrates an embodiment in which an image is blurred according to different types of input.

The blurring effect is applied to images differently in different situations. For example, as shown in FIG. 5, a blur effect 507 is applied to a video media item 505 that includes multiple sequential images 506. The blur effect is applied (e.g., by convolution module 110 of FIG. 1) according to one of a variety of inputs or masks (e.g., 501). These mask inputs define the shape of the intended blur 507, the size of the intended blur, indicate to which images the blur is to be applied, indicate how the blur is to be changed from image to image, indicate the quality of the blur, indicate the number of passes, or provide other characteristics of the blur. In some cases, the input mask 501 is a gradient 502 that is to be applied to specified pixels in the sequential images 506. In other cases, the input mask 501 is an image 503 whose data is convolved with one or more of the existing sequential images 506 to create the blur effect 507. In still other cases, the input mask 501 includes instructions 504 (e.g., from user 112 of FIG. 1) indicating how, where, and to what degree the blur effect 507 is to be applied to the video media item 505. In one example, the instructions indicate that the top half or bottom half of the image is to be blurred. In other cases, a square blur effect, a circular blur effect, or a rectangular blur effect is applied. Any of the inputs, including the gradient 502, the image 503, or the procedural instructions 504, may provide an indication of how and where the blur effect 507 is to be generated and applied.

This process is repeated for each image in the video media item. Some images receive no blur effect, while others receive one or more different blur effects. In some cases, each image is analyzed and blurred, while, in other cases, images are analyzed but are not blurred, thereby preserving resources. For instance, if a blur effect is the same or substantially the same between two or more images, the system will omit generation of a unique blur for that subsequent frame. In some cases, the computer system 101 of FIG. 1 determines that the amount of change in a blur effect between two or more frames is below a specified threshold. When the amount of change is below the threshold, the computer system 101 does not recompute the blur effect. However, when the amount of change (e.g., as indicated by the mask inputs 501) is above the threshold, the computer system 101 will recompute the blur effect. In some cases, the threshold is raised or lowered dynamically based on the amount of available computing resources. Thus, in such cases, the blur effect 507 is generated and applied dynamically in a manner that provides a sufficient blur effect while still preserving computing resources on the computer system 101.

As with the blur effect, the number of samples taken prior to generating a blur is also dynamically controlled according to user specification, device specification, or current computing resources. FIG. 6, for example, illustrates an embodiment in which pixels are sampled from within a sliding window. The number of pixels sampled, and the size and/or shape of the sliding window changes based on a variety of inputs and circumstances. In some cases, for example, the number of pixels that are to be sampled within a given sliding window is chosen by a user. In such cases, for instance, user 601 provides a user input indicating the characteristics of the sliding window (e.g., size, shape, placement, rotation, diagonal angle, etc.) and/or indicating how many pixels are to be sampled within the sliding window. In cases where the sliding window is larger, more pixels are sampled. In cases where the sliding window is smaller, fewer pixels are sampled. Thus, if the user selects a mid-size sliding window 606, more pixels will be sampled than if the user had chosen the smaller window 605. However, fewer pixels will be sampled than if the user 601 had chosen the larger sliding window 607. Thus, at least in some cases, the number of pixels sampled is dependent on the size of the sliding window. In other cases, the user simply specifies the number of pixels that are to be sampled, or specifies a computing resource threshold. This computing resource threshold provides an upper limit on computing resources used for sampling and generating a blur effect, thus preserving at least some computing resources for other purposes.

In some cases, the number of pixels that are to be sampled within the sliding window is selected based on electronic device specifications and/or available processing resources on the electronic device. In FIG. 6, for example, device characteristics 602 including device specifications or available processing resources are used to determine how many pixels are sampled for a given image and further specify characteristics of the sliding window. The device specifications or characteristics indicate, for example, the CPU's number of cores and/or clock speed, the total amount of random access memory, the amount of data storage on the device, the types of radios and bandwidth available on those radios, the GPU's number of cores, memory, and/or clock speed, or other computing resources' specifications.

In some cases, the computer system 101 of FIG. 1 or some other computer system is designed to run performance metrics on known devices (e.g., mobile phones, tablets, gaming systems, streaming devices, televisions, wearable devices, etc.). These performance metrics provide an indication of how well the device performs at receiving and transmitting data, encoding or decoding data, encrypting or decrypting data, generating blur or other effects, playing back movies or videos at a higher or lower rate, playing back videos at lower and higher resolutions, holding a steady number of frames per second, or provide other performance metrics. These performance metrics are then stored for each device, as they are gathered over time.

In some embodiments, the computer system 101 or some other computer system accesses these stored performance metrics to predict how well movie or video playback will work, or how well blur effects will be generated and applied on that electronic device. Then, without ever testing actual performance on a given device, the computer system will use its knowledge of previously tested systems and determine how well blur (or other) effects will be generated on the new device. In the case of blur effect generation and application, for instance, the computer system 101 determines that a minimum quality blur effect will be generated and applied to an image using X number of samples on that device. Thus, without even testing a new device, the computer system 101 determines that blur effects may be applied, but only with a certain number of samples X. The blur effect quality is thus increased or decreased to a certain level that fits the new device without having previously tested the new device.

In such cases, or in cases where the blur effect is to be applied using a device that has been test and has known processing resource constraints, the number of pixels that are to be sampled within the sliding window is dynamically adapted based on currently available processing resources. Thus, regardless of what the electronic device's specifications are, or how well the device fared in previous performance tests, the number of samples taken for any given image (or the size or radius or shape of the sliding window) varies based on the amount of currently available processing resources (e.g., 603 of FIG. 6).

For example, even if a user input 601 specified that Y number of samples were to be taken on a given image, or even if the device's specifications (on the device generating the blur effect) indicated that a superior quality blur effect was possible, the currently available processing resources 603 may indicate that the number of samples (or the size of the sliding window) is to be reduced. The computer system 101 determines, in some cases for example, that CPU and memory resources are being diverted to other tasks. The computer system 101 then determines that the pixel sampling module 110 can only sample Z number of pixels and then dynamically reduces the number of samples taken for image 114 (and for subsequent images) to Z. If the computer system's available computing resources 603 increase because another task finished, the number of samples Z is dynamically increased to a new value that will provide an optimum quality blur effect. Thus, even if a user specifies a desire for a very high-quality blur effect, the computer system 101 will dynamically reduce the quality of the blur effect (if the currently available computing resources calls for such) by dynamically reducing the number of samples taken for each image.

In some cases, the computer system 101 determines how many pixels to sample prior to accessing the image and then samples the determined number of pixels for that image. As such, the computer system determines, on a pixel-per-pixel basis, whether that pixel is to be sampled for that image.

Similarly, the characteristics of the sliding window 116 are also determined or adjusted with the sampling of each pixel. Thus, both the number of samples and the size, shape, or other characteristics of the sliding window are also determined on a pixel-by-pixel basis. This dynamism in generating blur and other effects ensures that the viewer sees the highest possible quality blur, while working within the operating constraints of the electronic device.

In addition to the method described above in conjunction with FIG. 2, a corresponding system includes at least one physical processor and physical memory comprising computer-executable instructions that, when executed by the physical processor, cause the physical processor to determine that at least a portion of an image is to be blurred, where the image includes multiple pixels arranged along at least one of a horizontal axis or a vertical axis, identify a boundary size for a sliding window within which pixel values are to be sampled from the image, and sample, from pixels that lie on an axis that is diagonal relative to at least one of the horizontal axis of the image or the vertical axis of the image, various pixel values from within the boundary of the sliding window. The pixels sampled along the diagonal angle within the sliding window are selected according to a specified noise pattern. The physical processor is further configured to perform an initial convolution pass on pixels surrounding the sampled pixels to blur at least some of the pixels surrounding the sampled pixels and then present the image, at some of which is blurred as a result of the initial convolution pass.

Figure 7A:
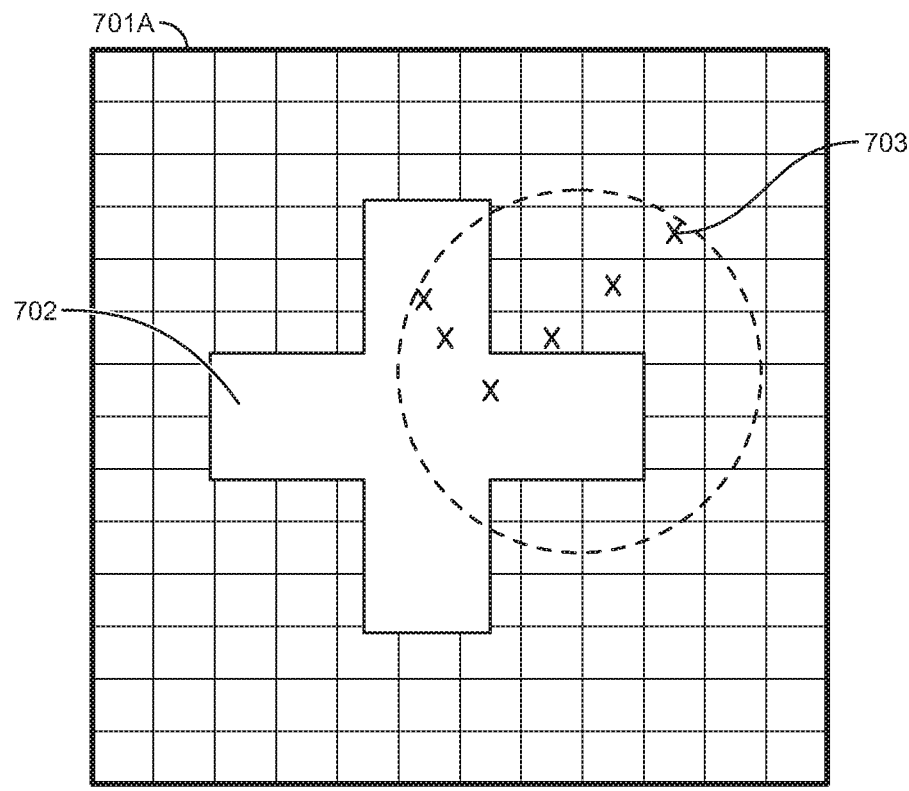
FIGS. 7A and 7B illustrate embodiments in which pixels are sampled along different diagonals based on content in the underlying image.
Figure 7B:
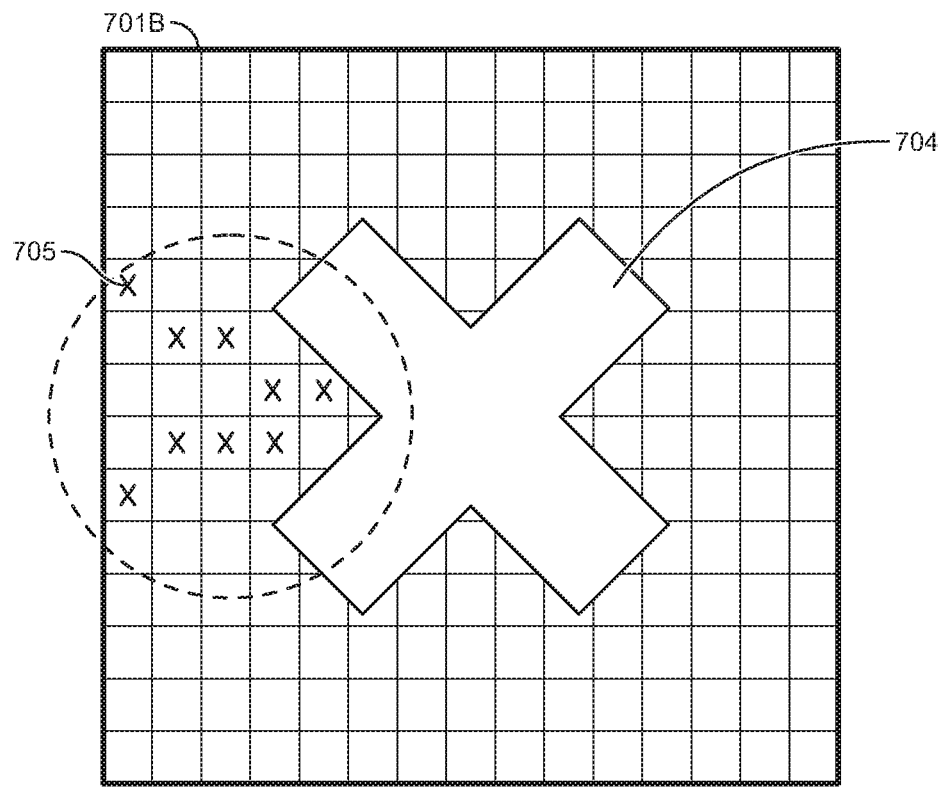

FIGS. 7A and 7B illustrate embodiments in which pixels are sampled at different diagonal angles depending on the form or structure of the underlying content. In some embodiments, the physical processor (e.g., 102 of FIG. 1) of computer system 101 is configured to identify various portions of content within the image 114. The content is identified using machine learning or similar content acquisition techniques. The computer system then determines that the identified content has various prominent angles. For example, as shown in FIG. 7A, the content of image 701A comprises a cross 702. The cross 702 includes multiple straight lines along the vertical and horizontal axes. If samples were to be taken in the traditional manner along the vertical and horizontal axes of the image grid, the blur effect generated from the samples would include ghosting and other artifacts. In the embodiments herein, the computer system 101 identifies the content in the image 701A and, based on the content, alters the sampling of pixels (e.g., 703). The alterations ensure that the sampling occurs along an axis that is diagonal relative to the horizontal and/or vertical axes of the image. In this manner, the altered sampling avoids the prominent horizontal and vertical angles of the cross 702 (or other image content).

In a similar fashion, if the underlying image content changes, such that the underlying content includes predominantly diagonal lines (e.g., rotated cross 704), the computer system still identifies the content and the predominant lines and determines how to appropriately alter the sampling so that samples are taken along lines that are diagonal to the existing diagonal lines (e.g., samples 705). By avoiding samples taken along the predominant lines, image artifacts generated during convolution are circumvented. In cases where the image includes text (e.g., on a user interface), many of the text characters have vertical and horizontal edges. In such cases, the diagonal pixel samples within the sliding window are taken along a 30-degree angle or a 45-degree angle relative to the horizontal edges of the sliding window. In some cases, the sliding window is rotated, and samples are again taken but at a different angle. After the sample is taken (for that pixel or for the whole image), the sliding window is rotated (or moved side to side) again, creating a "wiggle" effect as the sliding window circles or jitters around a pixel or set of pixels. In this manner, the sliding window includes and excludes different pixel samples as the sliding window continually changes. In some cases, the amount, direction, and type of change applied to the sliding window depends on which angles and shapes are determined to be the most prominent in the image content. The wiggling and other changes to the sliding widow improve the sampling of pixels and thereby improve the subsequent blur effect.

As noted above, the sampling (and the blur effect quality) is affected by the number of samples taken for each image. The blur effect quality is also affected by which pixels are sampled. As discussed earlier, simply sampling along horizontal or vertical image grid lines results in suboptimal quality, with artifacts and other visual anomalies. In some embodiments, the computer system 101 of FIG. 1 samples pixels according to a noise pattern. The noise pattern, in some cases, is a white noise pattern that omits no frequencies, and in other cases, the noise pattern is a blue noise filter or other noise filter that omits (or includes only) certain frequencies. In some case, the noise values are precomputed and are stored in a lookup table. The computer system 101 then consults this lookup table to access the noise values. The noise values are then used when determining which pixels to sample. Instead of sampling pixels (purely) randomly, or purely along a straight line, optimal blur effects are generated by sampling the pixels along a diagonal, but in a pseudo-random fashion. This pseudorandom fashion is a noise pattern or other similar pattern that yields optimal pixel sampling.

Figure 8:
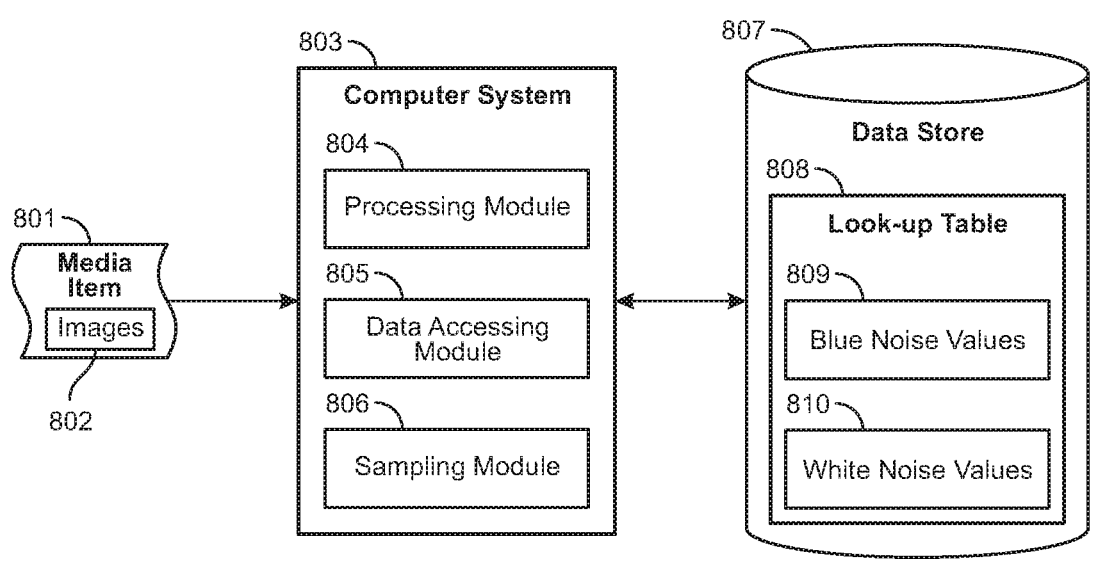
FIG. 8 illustrates an embodiment in which noise values are selectively accessed and implemented to identify sample pixels.

FIG. 8 illustrates an embodiment in which a computer system 803 implements blue noise values in an efficient manner. The computer system 803 (which is the same as or different than computer system 101 of FIG. 1) receives or otherwise accesses media item 801 that has a single image or a set of images 802. The data accessing module accesses noise values stored in data store 807, which is local or remote to computer system 803. In some cases, the data accessing module 805 accesses blue noise values 809 in lookup table 808. In other cases, the data accessing module 805 accesses white noise values 810 or some other noise or other pseudorandom values in lookup table 808. The sampling module 806 of computer system 803 then selects random numbers from the (blue) noise distribution indicating which pixels are to be sampled. This blue noise distribution provides a balanced sampling result when attempting to create an optimal blurring effect from a limited number of pixel samples.

In some cases, these accessed (blue) noise values are implemented for multiple samplings and multiple convolutions before new noise values are accessed. In other cases, new noise values are accessed for each new pixel sampling. This, however, will be taxing on the computer system's resources. Accordingly, in order to conserve computing resources, noise values (e.g., 809) are used for multiple pixel samplings and across multiple convolutions. In this manner, computing resources are further preserved on a mobile (potentially lower specification) device, while still producing a blurring that is aesthetically pleasing to the viewer. In some cases, after the blurring effect has been applied to the image(s), the computer system 803 is configured to transition back to the original, unblurred image. This transition back to the original image, including the removal of the image blurring, may occur over a specified amount of time and may occur slowly or quickly to emphasize or deemphasize the transition.

In some examples, the above-described method is encoded as computer-readable instructions on a computer-readable medium. For example, a computer-readable medium may include one or more computer-executable instructions that, when executed by at least one processor of a computing device, may cause the computing device to determine that at least a portion of an image is to be blurred, where the image includes multiple pixels arranged along at least one of a horizontal axis or a vertical axis, identify a boundary size for a sliding window within which pixel values are to be sampled from the image, and sample, from pixels that lie on an axis that is diagonal relative to at least one of the horizontal axis of the image or the vertical axis of the image, various pixel values from within the boundary of the sliding window. The pixels sampled along the diagonal angle within the sliding window are selected according to a specified noise pattern. The computing device is further configured to perform an initial convolution pass on pixels surrounding the sampled pixels to blur at least some of the pixels surrounding the sampled pixels and then present the image, at some of which is blurred as a result of the initial convolution pass.

In this manner, the embodiments described above allow blurring effects to be applied to images in a way that can be performed on substantially any device including low-specification mobile devices. The embodiments allow for dynamic variation in the choice of which pixels to sample, how many pixels to sample, how big the sampling window is, and in many other variables. Each of these selections may then change throughout the blurring process according to computing resources that are available (or not available) at the time. This allows the computing system to continually generate optimal blurring effects, regardless of any changes in the computing environment.

Figure 9:
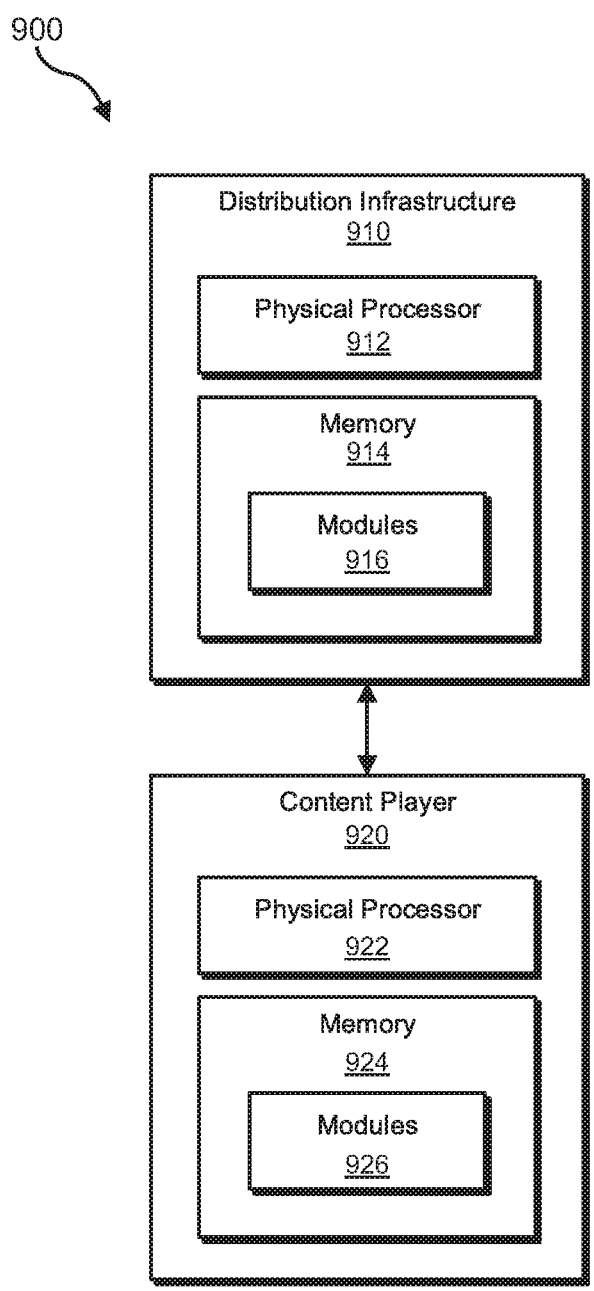
FIG. 9 is a block diagram of an exemplary content distribution ecosystem.
Figure 10:
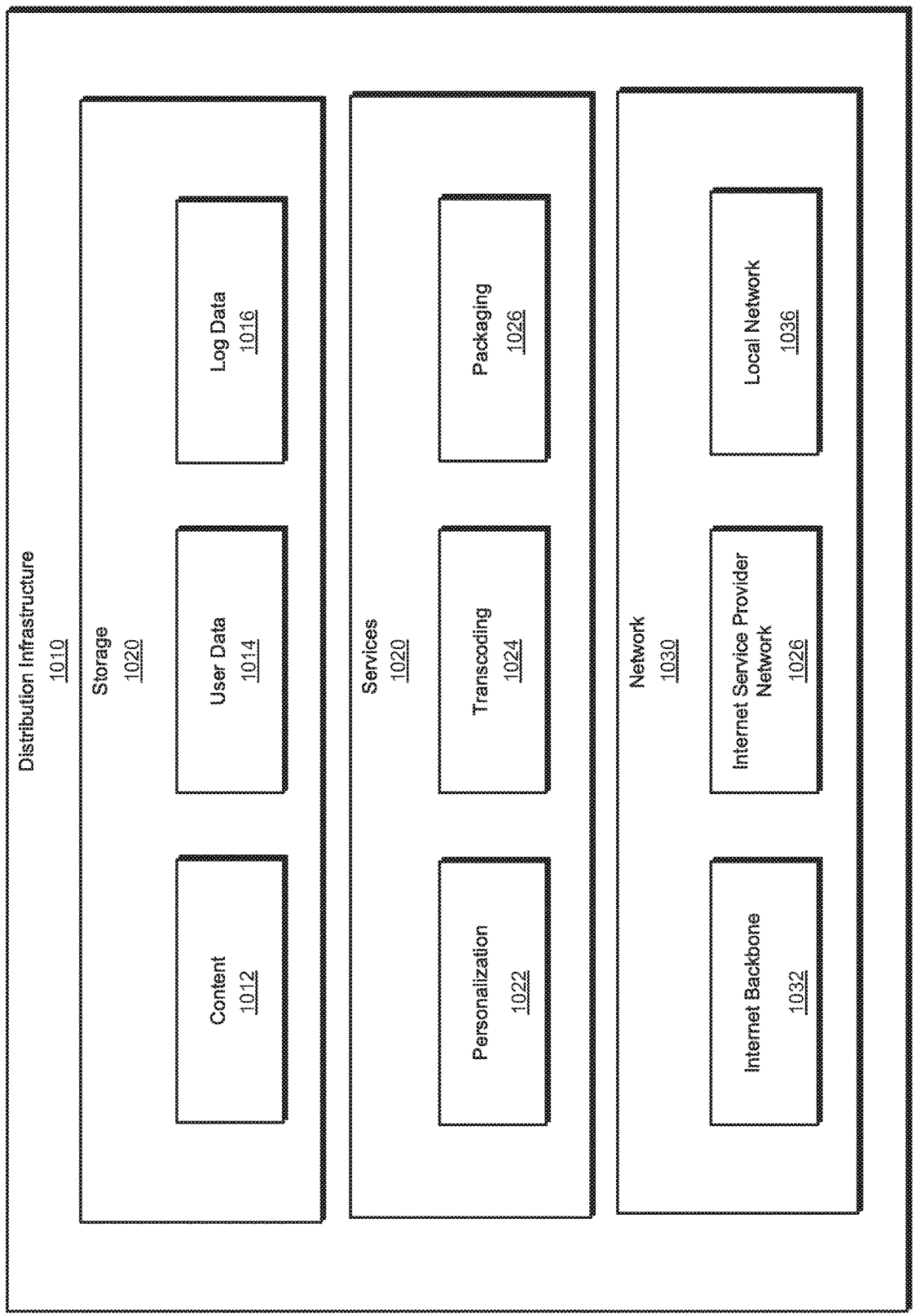
FIG. 10 is a block diagram of an exemplary distribution infrastructure within the content distribution ecosystem shown in FIG. 9.
Figure 11:
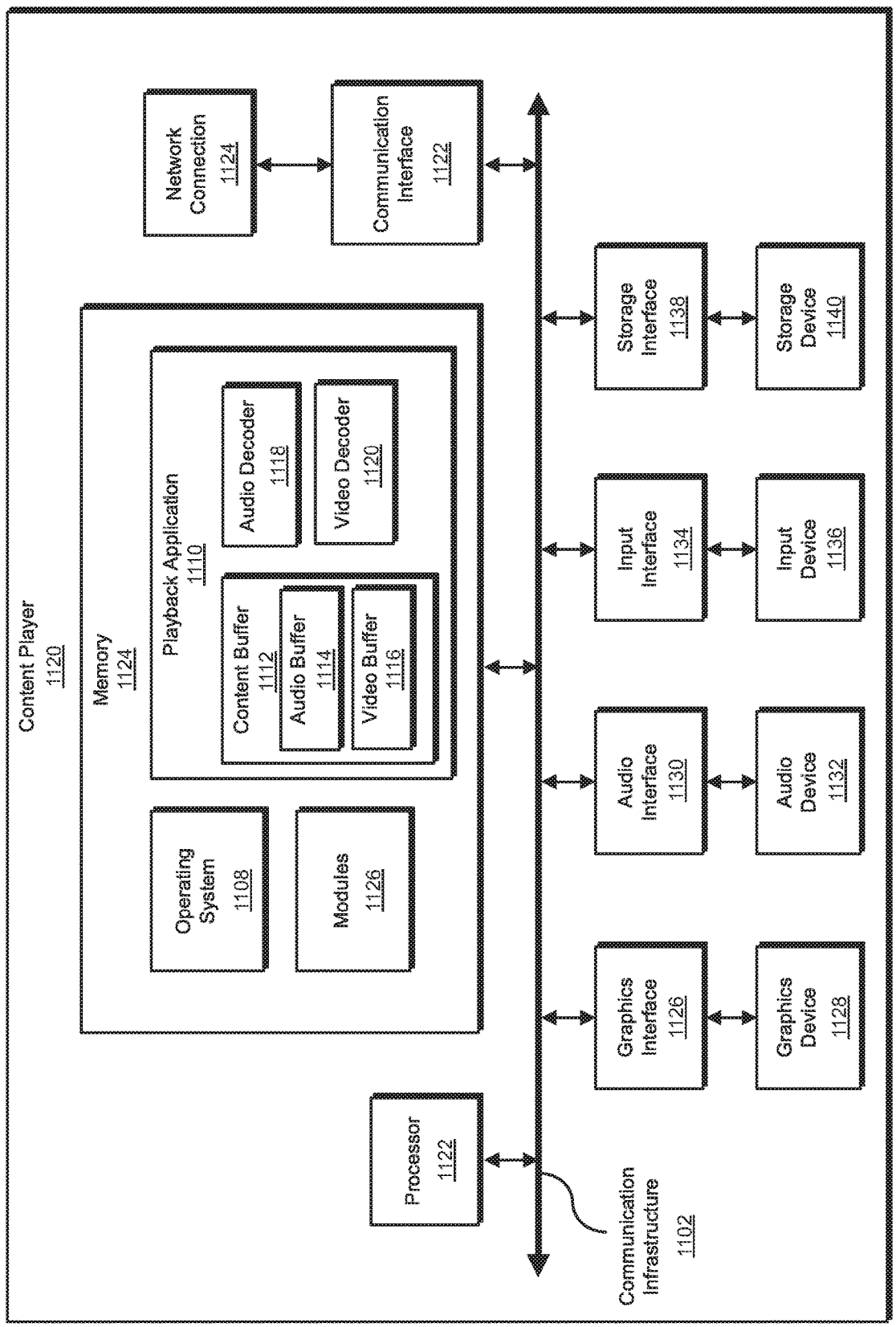
FIG. 11 is a block diagram of an exemplary content player within the content distribution ecosystem shown in FIG. 9.

The following will provide, with reference to FIG. 9, detailed descriptions of exemplary ecosystems in which content is provisioned to end nodes and in which requests for content are steered to specific end nodes. The discussion corresponding to FIGS. 10 and 11 presents an overview of an exemplary distribution infrastructure and an exemplary content player used during playback sessions, respectively. These exemplary ecosystems and distribution infrastructures are implemented in any of the embodiments described above with reference to FIGS. 1-8.

FIG. 9 is a block diagram of a content distribution ecosystem 900 that includes a distribution infrastructure 910 in communication with a content player 920. In some embodiments, distribution infrastructure 910 is configured to encode data at a specific data rate and to transfer the encoded data to content player 920. Content player 920 is configured to receive the encoded data via distribution infrastructure 910 and to decode the data for playback to a user. The data provided by distribution infrastructure 910 includes, for example, audio, video, text, images, animations, interactive content, haptic data, virtual or augmented reality data, location data, gaming data, or any other type of data that is provided via streaming.

Distribution infrastructure 910 generally represents any services, hardware, software, or other infrastructure components configured to deliver content to end users. For example, distribution infrastructure 910 includes content aggregation systems, media transcoding and packaging services, network components, and/or a variety of other types of hardware and software. In some cases, distribution infrastructure 910 is implemented as a highly complex distribution system, a single media server or device, or anything in between. In some examples, regardless of size or complexity, distribution infrastructure 910 includes at least one physical processor 912 and at least one memory device 914. One or more modules 916 are stored or loaded into memory 914 to enable adaptive streaming, as discussed herein.

Content player 920 generally represents any type or form of device or system capable of playing audio and/or video content that has been provided over distribution infrastructure 910. Examples of content player 920 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 910, content player 920 includes a physical processor 922, memory 924, and one or more modules 926. Some or all of the adaptive streaming processes described herein is performed or enabled by modules 926, and in some examples, modules 916 of distribution infrastructure 910 coordinate with modules 926 of content player 920 to provide adaptive streaming of multimedia content.

In certain embodiments, one or more of modules 916 and/or 926 in FIG. 9 represent one or more software applications or programs that, when executed by a computing device, cause the computing device to perform one or more tasks. For example, and as will be described in greater detail below, one or more of modules 916 and 926 represent modules stored and configured to run on one or more general-purpose computing devices. One or more of modules 916 and 926 in FIG. 9 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 912 and 922 generally represent any type or form of hardware-implemented processing unit capable of interpreting and/or executing computer-readable instructions. In one example, physical processors 912 and 922 access and/or modify one or more of modules 916 and 926, respectively. Additionally or alternatively, physical processors 912 and 922 execute one or more of modules 916 and 926 to facilitate adaptive streaming of multimedia content. Examples of physical processors 912 and 922 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 914 and 924 generally represent any type or form of volatile or non-volatile storage device or medium capable of storing data and/or computer-readable instructions. In one example, memory 914 and/or 924 stores, loads, and/or maintains one or more of modules 916 and 926. Examples of memory 914 and/or 924 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 10 is a block diagram of exemplary components of content distribution infrastructure 910 according to certain embodiments. Distribution infrastructure 910 includes storage 1010, services 1020, and a network 1030. Storage 1010 generally represents any device, set of devices, and/or systems capable of storing content for delivery to end users. Storage 1010 includes a central repository with devices capable of storing terabytes or petabytes of data and/or includes distributed storage systems (e.g., appliances that mirror or cache content at Internet interconnect locations to provide faster access to the mirrored content within certain regions). Storage 1010 is also configured in any other suitable manner.

As shown, storage 1010 may store a variety of different items including content 1012, user data 1014, and/or log data 1016. Content 1012 includes television shows, movies, video games, user-generated content, and/or any other suitable type or form of content. User data 1014 includes personally identifiable information (PII), payment information, preference settings, language and accessibility settings, and/or any other information associated with a particular user or content player. Log data 1016 includes viewing history information, network throughput information, and/or any other metrics associated with a user's connection to or interactions with distribution infrastructure 910.

Services 1020 includes personalization services 1022, transcoding services 1024, and/or packaging services 1026. Personalization services 1022 personalize recommendations, content streams, and/or other aspects of a user's experience with distribution infrastructure 910. Encoding services 1024 compress media at different bitrates which, as described in greater detail below, enable real-time switching between different encodings. Packaging services 1026 package encoded video before deploying it to a delivery network, such as network 1030, for streaming.

Network 1030 generally represents any medium or architecture capable of facilitating communication or data transfer. Network 1030 facilitates communication or data transfer using wireless and/or wired connections. Examples of network 1030 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 10, network 1030 includes an Internet backbone 1032, an internet service provider 1034, and/or a local network 1036. As discussed in greater detail below, bandwidth limitations and bottlenecks within one or more of these network segments triggers video and/or audio bit rate adjustments.

FIG. 11 is a block diagram of an exemplary implementation of content player 920 of FIG. 9. Content player 920 generally represents any type or form of computing device capable of reading computer-executable instructions. Content player 920 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 11, in addition to processor 922 and memory 924, content player 920 includes a communication infrastructure 1102 and a communication interface 1122 coupled to a network connection 1124. Content player 920 also includes a graphics interface 1126 coupled to a graphics device 1128, an input interface 1134 coupled to an input device 1136, and a storage interface 1138 coupled to a storage device 1140.

Communication infrastructure 1102 generally represents any type or form of infrastructure capable of facilitating communication between one or more components of a computing device. Examples of communication infrastructure 1102 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 924 generally represents any type or form of volatile or non-volatile storage device or medium capable of storing data and/or other computer-readable instructions. In some examples, memory 924 stores and/or loads an operating system 1108 for execution by processor 922. In one example, operating system 1108 includes and/or represents software that manages computer hardware and software resources and/or provides common services to computer programs and/or applications on content player 920.

Operating system 1108 performs various system management functions, such as managing hardware components (e.g., graphics interface 1126, audio interface 1130, input interface 1134, and/or storage interface 1138). Operating system 1108 also provides process and memory management models for playback application 1110. The modules of playback application 1110 includes, for example, a content buffer 1112, an audio decoder 1118, and a video decoder 1120.

Playback application 1110 is configured to retrieve digital content via communication interface 1122 and play the digital content through graphics interface 1126. Graphics interface 1126 is configured to transmit a rendered video signal to graphics device 1128. In normal operation, playback application 1110 receives a request from a user to play a specific title or specific content. Playback application 1110 then identifies one or more encoded video and audio streams associated with the requested title. After playback application 1110 has located the encoded streams associated with the requested title, playback application 1110 downloads sequence header indices associated with each encoded stream associated with the requested title from distribution infrastructure 910. A sequence header index associated with encoded content includes information related to the encoded sequence of data included in the encoded content.

In one embodiment, playback application 1110 begins downloading the content associated with the requested title by downloading sequence data encoded to the lowest audio and/or video playback bitrates to minimize startup time for playback. The requested digital content file is then downloaded into content buffer 1112, which is configured to serve as a first-in, first-out queue. In one embodiment, each unit of downloaded data includes a unit of video data or a unit of audio data. As units of video data associated with the requested digital content file are downloaded to the content player 920, the units of video data are pushed into the content buffer 1112. Similarly, as units of audio data associated with the requested digital content file are downloaded to the content player 920, the units of audio data are pushed into the content buffer 1112. In one embodiment, the units of video data are stored in video buffer 1116 within content buffer 1112 and the units of audio data are stored in audio buffer 1114 of content buffer 1112.

A video decoder 1120 reads units of video data from video buffer 1116 and outputs the units of video data in a sequence of video frames corresponding in duration to the fixed span of playback time. Reading a unit of video data from video buffer 1116 effectively de-queues the unit of video data from video buffer 1116. The sequence of video frames is then rendered by graphics interface 1126 and transmitted to graphics device 1128 to be displayed to a user.

An audio decoder 1118 reads units of audio data from audio buffer 1114 and output the units of audio data as a sequence of audio samples, generally synchronized in time with a sequence of decoded video frames. In one embodiment, the sequence of audio samples is transmitted to audio interface 1130, which converts the sequence of audio samples into an electrical audio signal. The electrical audio signal is then transmitted to a speaker of audio device 1132, which, in response, generates an acoustic output.

In situations where the bandwidth of distribution infrastructure 910 is limited and/or variable, playback application 1110 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1126 is configured to generate frames of video data and transmit the frames of video data to graphics device 1128. In one embodiment, graphics interface 1126 is included as part of an integrated circuit, along with processor 922. Alternatively, graphics interface 1126 is configured as a hardware accelerator that is distinct from (i.e., is not integrated within) a chipset that includes processor 922.

Graphics interface 1126 generally represents any type or form of device configured to forward images for display on graphics device 1128. For example, graphics device 1128 is fabricated using liquid crystal display (LCD) technology, cathode-ray technology, and light-emitting diode (LED) display technology (either organic or inorganic). In some embodiments, graphics device 1128 also includes a virtual reality display and/or an augmented reality display. Graphics device 1128 includes any technically feasible means for generating an image for display. In other words, graphics device 1128 generally represents any type or form of device capable of visually displaying information forwarded by graphics interface 1126.

As illustrated in FIG. 11, content player 920 also includes at least one input device 1136 coupled to communication infrastructure 1102 via input interface 1134. Input device 1136 generally represents any type or form of computing device capable of providing input, either computer or human generated, to content player 920. Examples of input device 1136 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 920 also includes a storage device 1140 coupled to communication infrastructure 1102 via a storage interface 1138. Storage device 1140 generally represents any type or form of storage device or medium capable of storing data and/or other computer-readable instructions. For example, storage device 1140 is a magnetic disk drive, a solid-state drive, an optical disk drive, a flash drive, or the like. Storage interface 1138 generally represents any type or form of interface or device for transferring data between storage device 1140 and other components of content player 920.

Many other devices or subsystems are included in or connected to content player 920. Conversely, one or more of the components and devices illustrated in FIG. 11 need not be present to practice the embodiments described and/or illustrated herein. The devices and subsystems referenced above are also interconnected in different ways from that shown in FIG. 11. Content player 920 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into content player 920. All or a portion of the computer program stored on the computer-readable medium is then stored in memory 924 and/or storage device 1140. When executed by processor 922, a computer program loaded into memory 924 causes processor 922 to perform and/or be a means for performing the functions of one or more of the example embodiments described and/or illustrated herein. Additionally or alternatively, one or more of the example embodiments described and/or illustrated herein are implemented in firmware and/or hardware. For example, content player 920 is configured as an Application Specific Integrated Circuit (ASIC) adapted to implement one or more of the example embodiments disclosed herein.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to sample one or more pixels, use the result of the transformation to blur the pixels, and store the result of the transformation after presenting the blurred pixels. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    determining, by a hardware processor of an electronic device, that at least a portion of an image is to be blurred, the image including a plurality of pixels arranged along at least one of a horizontal axis or a vertical axis;
    identifying a boundary size for a sliding window within which pixel values are to be sampled from the image, the sliding window including a plurality of different characteristics including window size, shape, placement, or rotation;
    sampling, from pixels that lie on an axis that is diagonal relative to at least one of the horizontal axis of the image or the vertical axis of the image, one or more pixel values from within the boundary of the sliding window, wherein the plurality of characteristics of the sliding window are dynamically changeable at each pixel sampled during the sampling, and wherein the pixels sampled along the diagonal angle within the sliding window are selected according to a specified noise pattern;
    identifying one or more computing resources of the electronic device including at least the hardware processor;
    performing an initial convolution pass on one or more pixels surrounding the sampled pixels to blur at least some of the pixels surrounding the sampled pixels, wherein the blurring is performed at a variable quality level that is dynamically determined based on the identified computing resources of the electronic device; and
    presenting the image, at least a portion of which is blurred as a result of the initial convolution pass.

2. The computer-implemented method of claim 1, further comprising performing a subsequent convolution pass on one or more different image pixels surrounding the sampled pixels.

3. The computer-implemented method of claim 2, wherein the initial convolution pass is performed at a specified diagonal angle, and wherein the subsequent convolution pass is performed at an opposite diagonal angle that is opposite to the specified diagonal angle.

4. The computer-implemented method of claim 2, wherein multiple-pass convolutions are performed to reduce a number of samples taken within the sliding window.

5. The computer-implemented method of claim 1, wherein the image is one of a plurality of sequential images in a video media item.

6. The computer-implemented method of claim 1, wherein at least a portion of the plurality of sequential images is sequentially blurred according to the sampling.

7. The computer-implemented method of claim 1, wherein the pixels within the sliding window are selected for sampling on a per-pixel basis.

8. The computer-implemented method of claim 1, further comprising, subsequent to presenting the blurred image, transitioning back to the original, unblurred image.

9. The computer-implemented method of claim 1, wherein a specified number of pixels are sampled from within the sliding window.

10. The computer-implemented method of claim 1, wherein the specified number of pixels that are to be sampled within the sliding window is selected by a user.

11. The computer-implemented method of claim 10, wherein the specified number of pixels that are to be sampled within the sliding window is selected based on at least one of electronic device specifications and available processing resources on the electronic device.

12. The computer-implemented method of claim 11, wherein the specified number of pixels that are to be sampled within the sliding window is dynamically adapted based on currently available processing resources.

13. A system comprising:
at least one physical processor of an electronic device; and
physical memory comprising computer-executable instructions that, when executed by the physical processor, cause the physical processor to:
determine, by the physical processor of the electronic device, that at least a portion of an image is to be blurred, the image including a plurality of pixels arranged along at least one of a horizontal axis or a vertical axis;
identify a boundary size for a sliding window within which pixel values are to be sampled from the image, the sliding window including a plurality of different characteristics including window size, shape, placement, or rotation;
sample, from pixels that lie on an axis that is diagonal relative to at least one of the horizontal axis of the image or the vertical axis of the image, one or more pixel values from within the boundary of the sliding window, wherein the plurality of characteristics of the sliding window are dynamically changeable at each pixel sampled during the sampling, and wherein the pixels sampled along the diagonal angle within the sliding window are selected according to a specified noise pattern;
identify one or more computing resources of the electronic device including at least the physical processor;
perform an initial convolution pass on one or more pixels surrounding the sampled pixels to blur at least some of the pixels surrounding the sampled pixels, wherein the blurring is performed at a variable quality level that is dynamically determined based on the identified computing resources of the electronic device; and
present the image, at least a portion of which is blurred as a result of the initial convolution pass.

14. The system of claim 13, wherein the sliding window comprises a circle with a specified radius within which the one or more pixels are sampled, and wherein the size of the radius is dynamically controlled per-pixel.

15. The system of claim 13, further comprising:
identifying one or more portions of content within the image;
determining that the identified content has one or more prominent angles; and
altering the sampling of pixels that lie on an axis that is diagonal relative to at least one of the horizontal axis of the image or the vertical axis of the image, such that the altered sampling avoids the one or more prominent angles.

16. The system of claim 15, further comprising rotating the sliding window by a dynamically determined amount at each sampled pixel.

17. The system of claim 13, wherein the specified noise pattern comprises a blue noise filter.

18. The system of claim 17, wherein noise values selected from the blue noise pattern are accessed from a lookup table, and wherein the accessed noise values are implemented for a plurality of convolutions before new noise values are accessed.

19. The system of claim 18, wherein the sliding window is at least partially altered prior to performing each convolution.

20. A non-transitory computer-readable medium comprising one or more computer-executable instructions that, when executed by at least one processor of a computing device, cause the computing device to:
determine, by a hardware processor of an electronic device, that at least a portion of an image is to be blurred, the image including a plurality of pixels arranged along at least one of a horizontal axis or a vertical axis;
identify a boundary size for a sliding window within which pixel values are to be sampled from the image, the sliding window including a plurality of different characteristics including window size, shape, placement, or rotation;
sample, from pixels that lie on an axis that is diagonal relative to at least one of the horizontal axis of the image or the vertical axis of the image, one or more pixel values from within the boundary of the sliding window, wherein the plurality of characteristics of the sliding window are dynamically changeable at each pixel sampled during the sampling, and wherein the pixels sampled along the diagonal angle within the sliding window are selected according to a specified noise pattern;
identify one or more computing resources of the electronic device including at least the hardware processor;
perform an initial convolution pass on one or more pixels surrounding the sampled pixels to blur at least some of the pixels surrounding the sampled pixels, wherein the blurring is performed at a variable quality level that is dynamically determined based on the identified computing resources of the electronic device; and
present the image, at least a portion of which is blurred as a result of the initial convolution pass.

* * * * *

UNITED STATES PATENT AND TRADEMARK OFFICE
CERTIFICATE OF CORRECTION

PATENT NO. : 11,317,150 B2
APPLICATION NO. : 16/904554
DATED : April 26, 2022
INVENTOR(S) : Juha Turunen Page 1 of 1

It is certified that error appears in the above-identified patent and that said Letters Patent is hereby corrected as shown below:

On the Title Page

In item (72), in Column 1, in "Inventors", Line 1, delete "Sunnyale," and insert -- Sunnyvale, --.

Signed and Sealed this
Twenty-seventh Day of September, 2022

Katherine Kelly Vidal
*Director of the United States Patent and Trademark Office*